May 24, 1960

M. REDFIELD 2,937,583

CAMERA

Filed Aug. 29, 1955

INVENTOR.
MONROE REDFIELD

BY
Robert A. Sloman
ATTORNEY

May 24, 1960    M. REDFIELD    2,937,583
CAMERA
Filed Aug. 29, 1955    5 Sheets-Sheet 2
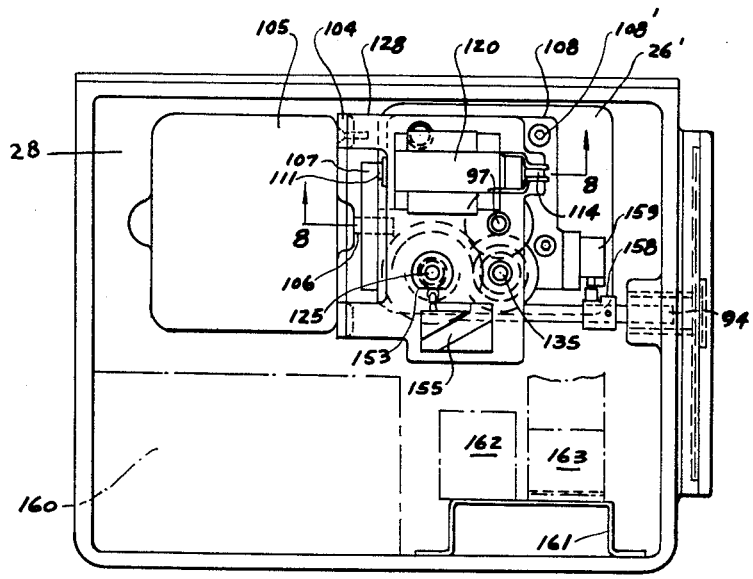
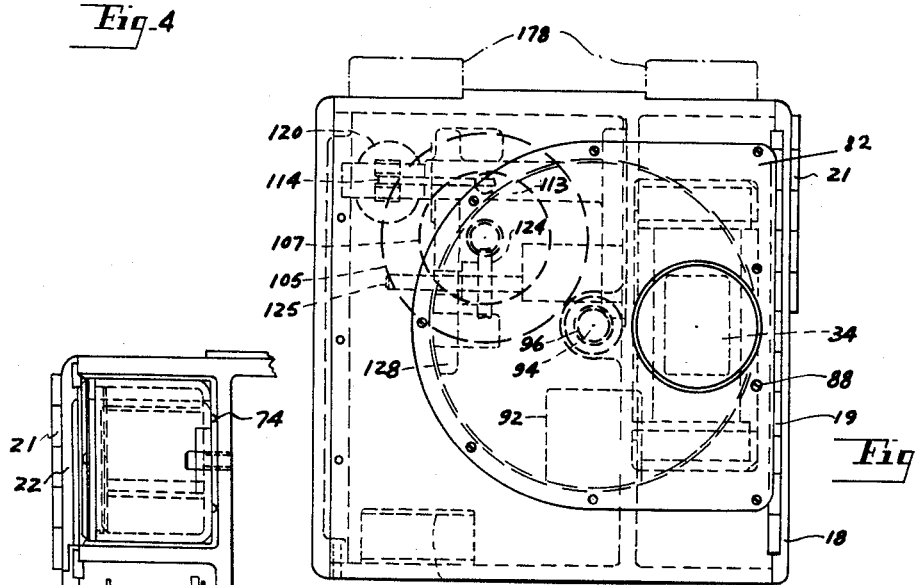
INVENTOR.
MONROE REDFIELD
BY
Robert A. Sloman
ATTORNEY May 24, 1960  M. REDFIELD  2,937,583
CAMERA
Filed Aug. 29, 1955  5 Sheets-Sheet 3
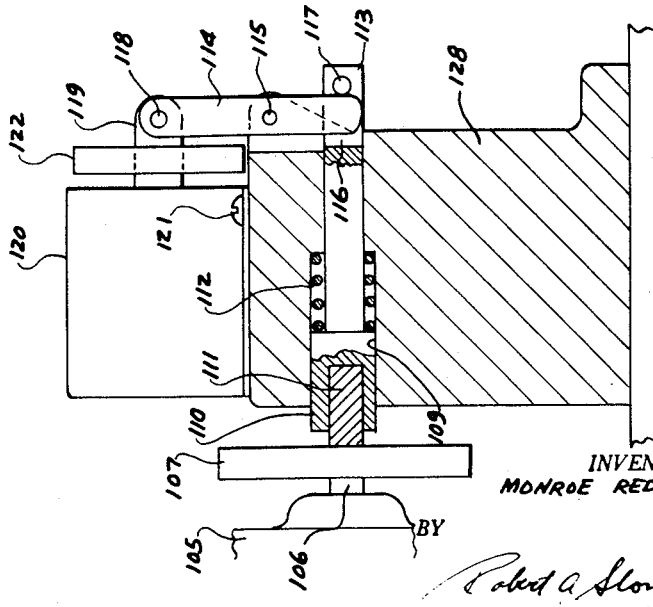
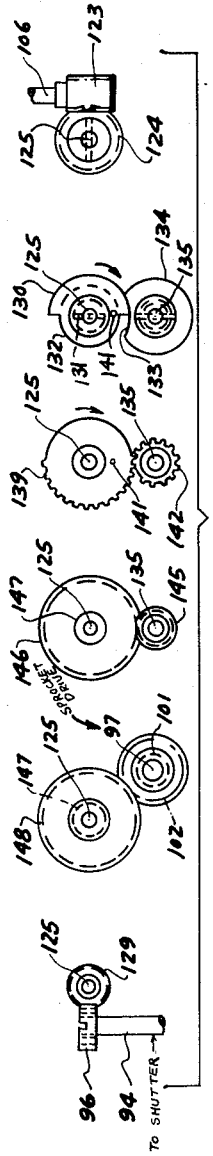
INVENTOR.
MONROE REDFIELD
BY
Robert A. Sloman
ATTORNEY

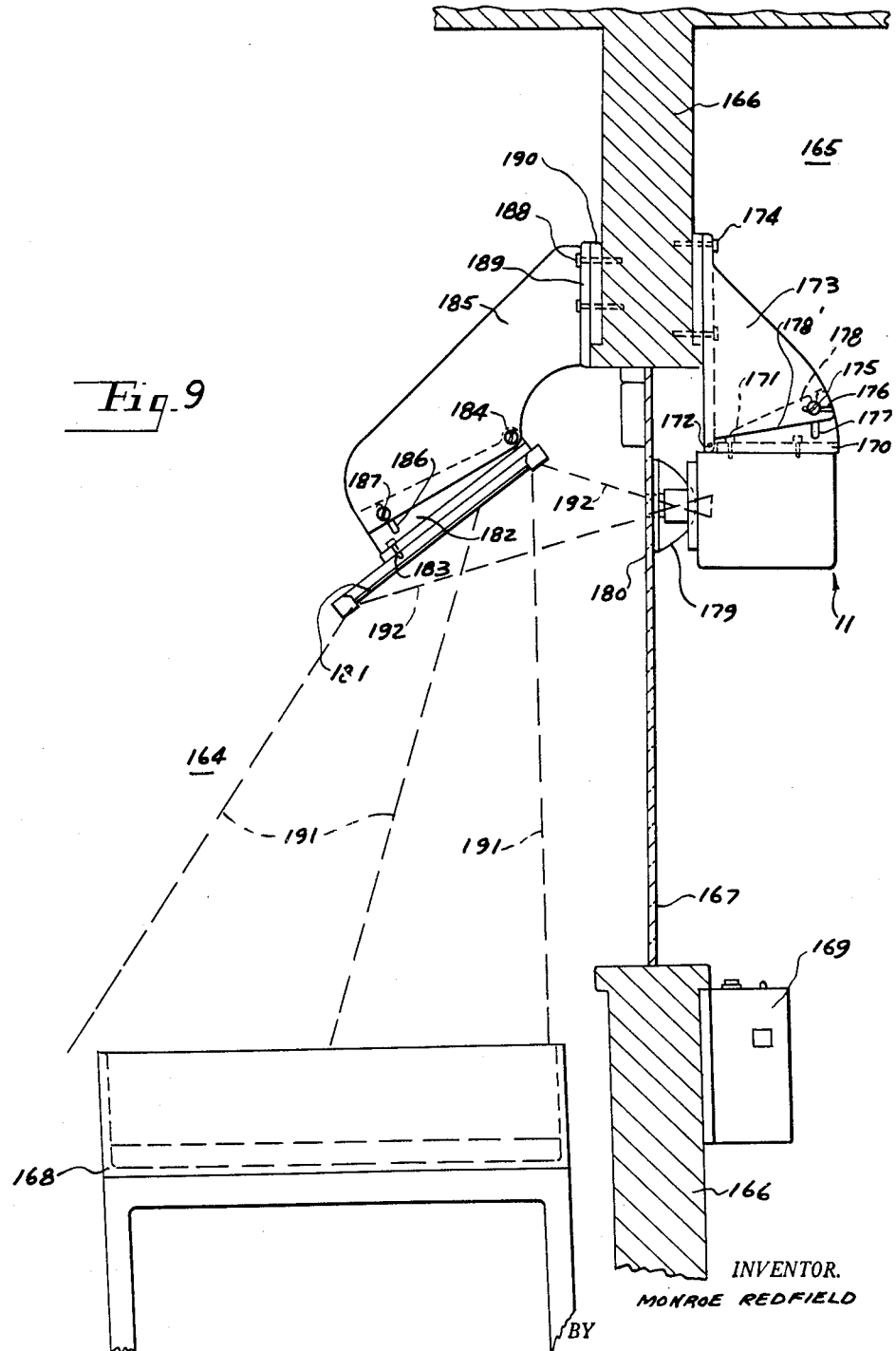

May 24, 1960

M. REDFIELD 2,937,583

CAMERA

Filed Aug. 29, 1955

INVENTOR.
MONROE REDFIELD.
BY
Robert A. Sloman
ATTORNEY

United States Patent Office 2,937,583
Patented May 24, 1960

2,937,583

CAMERA

Monroe Redfield, Birmingham, Mich., assignor to
Ray A. Shapero, Detroit, Mich.

Filed Aug. 29, 1955, Ser. No. 531,079

2 Claims. (Cl. 95—11)

This invention relates to cameras, and more particularly, to a power operated camera.

It is the object of the present invention to provide an electric motor driven film feed sprocket driving mechanism.

It is a further object of this invention to provide a novel driving mechanism for a rotating shutter disc and means for limiting rotation thereof to a single 360 degrees rotation and therefore a single exposure.

It is the further object of the present invention to provide a novel control arm engageable with the spool of unexposed film on a reel to indicate substantially the end of the film and to prevent further energization of the film sprocket driving motor until the film is replaced.

It is the further object of the present invention to provide a novel film guide housing.

It is the further object of the present invention to provide separate compartments in the camera housing for removably supporting an exposed film storage can, together with means to permit removal of the exposed film and its can merely by severing the film upon the exterior of said can.

It is the further object of the present invention to provide a novel construction of exposed film storage can which may be easily removed from the camera housing and its independent storage compartment and for permitting easy replacement thereof without otherwise exposing the unexposed film within the camera housing.

It is the further object of the present invention to provide a novel power transmission to the shutter drive shaft for said camera.

It is the further object of the present invention to provide a novel transmission for the film driving shaft whereby the film is fed through the film guide only after an initial 180 degrees rotation of the shutter and only throughout the remaining 180 degrees of a single rotation of said shutter.

It is the still further object of the present invention to provide a novel solenoid releasable motor drive shaft brake mechanism.

It is the still further object of the present invention to provide a novel combination of the present camera construction in conjunction with mechanism for photographing babies in a hospital nursery under a coin controlled mechanism.

These and other objects will be seen from the following specification and claims in conjunction with the appended drawings, in which:

Fig. 2 is a fragmentary right end elevational view thereof, but showing the closure door in position.

Fig. 3 is a left end elevational view of the camera.

Fig. 4 is a fragmentary top plan view of the camera shown in Fig. 1, but reversed as to direction.

Fig. 6 is a fragmentary and partially sectioned and partially diagrammatic illustration of the power transmission of the camera.

Fig. 7 is a diagrammatic illustration of the same.

Fig. 8 is a fragmentary section taken on line 8—8 of Fig. 4.

Fig. 9 is an elevational view partially in section illustrating the combination of the present camera in conjunction with a coin control therefor, and a mirror mechanism in conjunction with a nursery wall.

Figure 1:
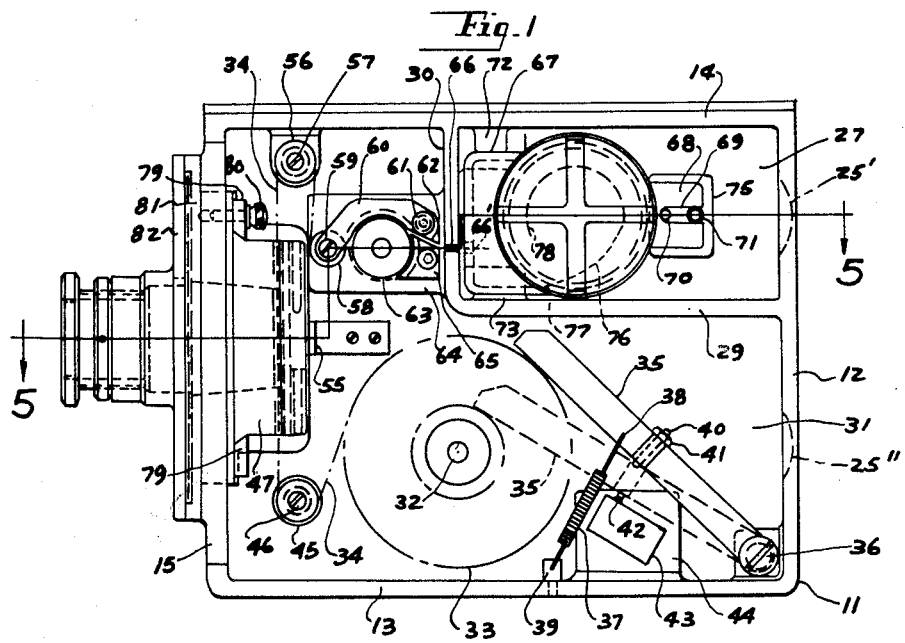
Fig. 1 is a side elevational view of the present camera construction with the closure door thereof removed to permit clear illustration of the interior of said housing.

It will be understood that the above drawings illustrate merely a preferred embodiment of the invention, and that other embodiments are contemplated within the scope of the claims hereinafter set forth.

*Camera housing*

Referring to the drawings, the camera housing is generally indicated at 11, and includes rear wall 12, bottom wall 13, top wall 14, and front wall 15, the opposite side portions thereof being initially open.

The camera housing also includes the removable upright side wall 16 which has a laterally extending continuous peripheral flange 17 adapted to be frictionally projected into the bounding wall portions of said housing for closing one of the open ends thereof.

The opposite open end of said housing is closed by the upright generally rectangularly shaped door 18 which is hingedly connected at its leading upright edge as at 19 with suitable gaskets 20 and 23 employed for providing a light, tight seal for the said open end of the camera housing.

Figure 5:
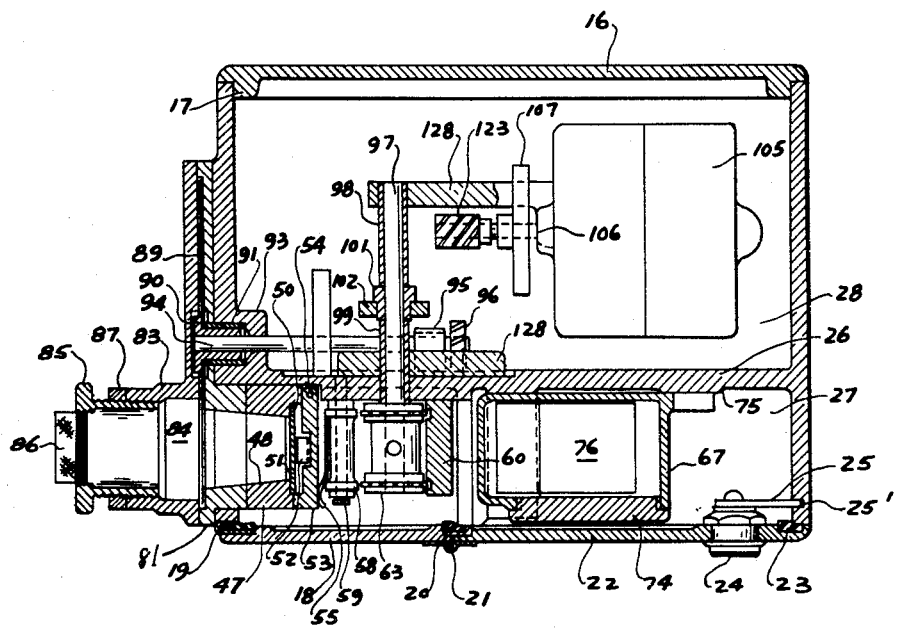
Fig. 5 is a horizontal section taken on line 5—5 of Fig. 1.

As shown in Figs. 1 and 5, the upper rear portion of door 18 corresponding to chamber 27 is cut away, providing for a separate closure door 22 which is coextensive with compartment 27 and which is hinged to door 18 by the upright hinge 21 along the forward upright edge of door 22, which door also cooperates with the gasket 23 for providing a light, tight seal for exposed film storage chamber 27, hereafter described.

Manually rotatable latch 24 is arranged adjacent the lower rear portion of door 22 and extends therethrough carrying latch bar 25 which is adapted to retainingly nest within a corresponding slot 25' formed within rear wall 12 for securing door in closed position. Though not shown, a second latch 24, similar to the above described latch, is also mounted within door 18 adjacent its rear edge and carries a latch element adapted for cooperative registry within the corresponding arcuate slot 25", whereby this door may be effectively maintained closed and against accidental opening.

Upright partition 26, best illustrated in Figs. 2 and 5, extends throughout the height of said housing between the top and bottom walls, as well as the front and rear walls, to thereby define on one side thereof and within said housing the chamber 28 within which is positioned and secured the driving motor and the transmission mechanism for establishing a driving relation between said motor and the shutter driving shaft, as well as the film feed driving sprocket. Access to chamber 28 may be obtained merely by removal of cover 16, as shown in Fig. 5.

Upon the other side of partition 26 and adjacent an upper portion thereof there is provided a horizontally disposed partition 29 which extends between partition 26 and the door 18, and furthermore, extends forwardly towards the front wall 15 to a point intermediate the front and rear walls, and thereafter extends upwardly as at 30, joining the top wall 14 to thereby define with the said partition 26, as well as the door 22, the exposed film storage chamber 27.

Below chamber 27, as well as the partition wall 29, and forwardly thereof, and forwardly of partition wall 30, all upon the same side of partition 26, there is provided the additional independent chamber 31 within which is housed the reel 33, carrying the coil of unexposed film 34. Also housed within chamber 31 at the forward portion thereof are suitable guide means for the film before and after exposure, together with the film driving sprocket and the hold-down guide 60 in conjunction therewith whereby the exposed film is directed through slot 66, hereafter described, and into a corresponding open slot 66' formed in the front wall of can 67.

*Film supply, film guide, and film drive mechanism*

The said reel 33 is loosely journaled upon the horizontally disposed pin 32 which is secured at its inner end to partition 26 and which projects into chamber 31. The film unwinds from reel 33 as indicated at 34 and extends around film guide 45 which is journaled upon the pin 46 which projects inwardly from partition wall 26.

Elongated arm 35 is positioned within chamber 31 and at its lower end is pivotally mounted as at 36 to a lower portion of partition 26. Said arm extends angularly upward and forwardly with its upper free end loosely resting upon the outer portion of the wound film 34 upon spool 33. Coiled spring 37 is anchored at one end to said housing as at 39 and at its opposite end is joined to an intermediate portion of arm 35 as at point 38. Contact element 40 in the form of a bolt is secured to arm 35 and extends transversely of a central portion thereof and projects therefrom, being adjustably secured in position by the nut 41. The lower end of contact element 40 is adapted for contact and registry with push button 42 on limit switch 43 which is mounted upon the boss 44 upon the lower interior portion of chamber 31 to thereby indicate when energized due to the falling of arm 35, that substantially all of film 34 has been utilized. This switch 43 is adapted to indicate in a suitable manner that the camera may not be used until further unexposed film is supplied. This method of indication may be in the nature of an illuminated signal or may be more properly tied into the electrical circuit with the driving motor for de-energizing the same until fresh film has been supplied. For this purpose all that is necessary is the opening of door 18 to permit removal of reel 33 and the replacement of another such reel. The opening of door 18 also permits the proper assembly of the film as it leaves the reel, extends around guide 45 and upwardly through the film guide 47, hereafter described.

*Film guide mechanism*

The said film guide 47 has a conventional outwardly diverging aperture 48 for communication with the camera lens 86, in the manner hereafter described. Aperture 48 at its rear end terminates in the upright opposed shoulders 50 against which the upwardly movable film 34 loosely bears. The pad 51 is mounted upon the leaf spring 52 which provides a support therefor, the opposite end of said spring being secured to the gate 53 which is pivoted as at 54 to a rear portion of the film guide 47 for normally maintaining the pressure pad 51 loosely against the film 34 as it is fed upwardly along the ledges 50. The additional leaf spring 55 is anchored to a portion of partition 26 and its free end retainingly engages gate 53 for normally maintaining the same in the position shown in Fig. 5.

The film 34 continues upwardly above the film guide 47 and extends over guide roller 56 which is loosely journaled upon pin 57, also carried in a horizontal position by partition 26, as indicated in Fig. 1.

The film 34 continues downwardly around guide roller 58 carried upon pin 59 also shown in Fig. 5, and thence the said film is engaged at its opposite marginal edges by the drive sprocket 63, being loosely held down with respect thereto by the hold-down plate 60, which is pivotally mounted upon the housing also at point 59 and which element 60 has towards its rear end an additional guide slot 62 which cooperates with the stationary guide 65 for guiding the exposed film through the transverse slot 66 in partition 30, and through a corresponding slot 66' formed in the front wall of film storage can 67.

Knob 61 is secured to the rear portion of hold-down element 60 to permit manual lifting thereof about the pivot 59 to facilitate insertion of the film in the first instance over and around drive sprocket 63.

The said pin 59, as well as the guide elements 65 and 60, are mounted upon the boss 64 which forms a part of partition 26.

*Exposed film storage can and supporting chamber*

The film storage can 67 is adapted for positioning snugly within chamber 27 with the forward formed end portion thereof rested upon the boss 73 upon partition wall 29 and with the opposing upper wall portion of said can cooperatively received and retained by the depending boss 72 which extends from top wall 14.

A pair of pins 70 and 71 project laterally outward from partition 26 into chamber 27 over which supportably extends the bifurcated element 68 whose slot 69 cooperatively receives the said pins and provides therefor a support for the rear portion of the can 67.

Can 67, as shown in Fig. 5, has a removable tight fitting cover 74 for excluding light from the exposed film 34 stored upon the interior of removable interchangeable can 67. The bifuracted element 68, as shown in Figs. 1 and 5, rests against the inwardly projecting boss 75 formed upon partition 26.

Flexible leaf spring 76 is anchored upon the interior of can 67 adjacent the forward rear portion thereof at point 77, said leaf spring being reversed coiled throughout a substantial portion of a single convolution as indicated at 78 to thereby provide an expansive receiver for the exposed film 34 as it is fed into said can and engages the interior surface of spring 76 to thereby form a coil of exposed film within the said formed leaf spring-like support.

This construction provides a very simple and novel mechanism for storing the exposed film. Furthermore, the exposed film is stored in the light sealed compartment 27 and within the can 67. The said can may be removed at any time to take out the exposed film for processing without in any manner interfering with the original set-up of the camera and the unexposed film therein. This is accomplished by merely opening the separate door 22 upon release of its latch and swinging the same outwardly, thus permitting a lateral outward removal of the film storage can 67. Of course, the film must be severed as at point 66' upon the exterior of the can before the said can may be removed. When the new replacement can is inserted the free end of the film extending through slot 66 in partition 30 must be manually fed partially through the aperture 66' and into the body of can 67 to assure the proper continued feed thereof of the said film in the manner above described.

As best illustrated in Fig. 1, the film guide housing 47 is secured in upright position against front wall 15 by a pair of block plates 79 and the studs 80, the said studs being suitably threaded into front wall 15 for securing the said film guide in the upright position shown.

*Shutter housing and lens mount*

The shutter housing 81 is mounted upon the front surface of camera front wall 15 and is suitably recessed to receive the power rotated disc shaped shutter 89. The shutter housing is completed by the application of the lens mounting plate 82, Figs. 1 and 3, which is secured in position by a plurality of screws 88.

Projecting forwardly of plate 82 and arranged upon one side thereof, as indicated in Figs. 3 and 5, there is provided the circularly shaped lens holder 83 which is centrally apertured as at 84 for axial registry with the corresponding aperture 48 formed in the lens guide 47. The lens focusing knob 85 which mounts the proper lens 86 is mounted within lens support 83 and is adapted for in and out longitudinal adjustments with respect thereto and may be secured in adjusted position as by the lock nut 87.

Shutter disc 89 is centrally secured to hub 90, in turn secured to the outer end of shutter drive shaft 94, said hub being journaled within bushing 91 nested within the boss 93 forming a part of the front wall 15 of the camera housing. Shaft 94 extends rearwardly and is journaled through the rearwardly arranged boss 95 carried upon partition 26 and located within chamber 28. Shaft 94 carries the gear 96 at its outer end which is adapted to receive a driving force from an intermeshing gear 129, hereafter to be described in conjunction with the power transmission, Figs. 6 and 7.

Shutter disc 89 as shown in Fig. 3 has formed therethrough adjacent its periphery a single rectangularly shaped transverse aperture 92 which, upon rotation of the said shutter from the stopped position shown, is adapted during rotation to register temporarily with the lens 86 and the aperture 48 within the film holder 47. At which time and in the manner hereafter described, a single frame of the said film, while remaining stationary, is exposed with respect to an image being photographed during the momentary period that the said aperture 92 registers with aperture 48. In the manner hereafter described, in the preferred embodiment of the invention, the shutter 89 is adapted for a single continuous 360 degree rotation from the position shown in Fig. 3, which means that its aperture 92 will only once pass the light aperture 48 for exposing a single frame of film 34. Thus after the first 90 degrees of rotation of shutter disc 89, its aperture 92 registers with lens 86 and aperture 48.

In the manner hereafter described, there will be no power feeding of the film for the first 180 degrees of rotation of the said shutter, and after which the film will be fed throughout and during the last 180 degrees of rotation of the said shutter, returning aperture 92 to the normal stop position of Fig. 3, after which the drive motor will be automatically de-energized.

*Sprocket drive*

Sprocket drive shaft 97 is journaled through the elongated bushings 98 and 99 which are respectively supported transversely of and through partition 26, as well as through the support bracket 128 shown in Fig. 5. The outer end of shaft 97 is secured to the drive sprocket 63. Intermediate the ends of shaft 97 there is provided drive gear 102 which is secured upon the locating hub 101 secured in driving relation to shaft 97 whereby a rotative drive is secured for sprocket drive shaft 97 through the intermeshing of power driven gear 148, Fig. 7, in the manner hereafter described.

Referring to Fig. 4, motor mounting bracket 128 is suitably secured to partition 26 upon the interior of said housing. Upon the end of bracket 128 there is secured by suitable fasteners motor mounting plate 104 which carries electric motor 105 which is thus suspended within chamber 28 in the manner also shown in Fig. 5. Said motor has a drive shaft 106 which has keyed thereto at its outer end the worm 123 for operating the power transmission mechanism hereafter described. Intermediate the ends of shaft 106 there is secured clutch plate 107 which is further illustrated on a larger scale in Fig. 8.

Mounting bracket or support 128 of Fig. 8 provides a support for the piston 110 which is longitudinal movable within the transverse bore 109 in said support. Said piston has centrally secured therein and projecting outwardly therefrom the brake pad 111 which is adapted to frictionally engage peripheral portions of clutch plate 107 for normally maintaining motor 105 inoperative.

Rod 113 is joined to piston 110 and extends through bore 109 and through a corresponding aperture of reduced diameter formed in support 128 and is transversely slotted at its outer end at 116. Coiled spring 112 surrounds rod 113 and is interposed between bracket 128 and the inner end of piston 110 normally urging the brake shoe 111 outwardly into frictionally retaining engagement with disc 107. Lever 114 is pivotally mounted intermediate its ends at 115 on support 128 and one free end of said lever projects into slot 116 in rod 113 in cooperative engaging relation with the transverse pin 117. The opposite end of lever 114 is pivotally connected at 118 to the retractable plunger 119 which extends axially from solenoid 120 which is anchored at 121 to support 128.

Core 122 is secured to plunger 119 and is cooperable with solenoid housing 120 for limiting the inward movement of plunger 119, when the said solenoid is energized. When an electrical connection is established to the drive motor 105 there will be a simultaneous energization of solenoid 120, causing inward movements of plunger 119 and a release of the clutch disc 107 whereby shaft 106 is free to rotate for driving the camera shutter and for successively driving the film feed mechanism.

*Transmission mechanism*

The power transmission mechanism for the present camera is essentially stored within compartment 28 of the camera and is best illustrated in the diagrammatic illustrations Figs. 6 and 7. Primarily, the worm 123 driven by the said motor is at all times in mesh with worm gear 124 which is anchored by pin 124' to the shaft 125 which is mounted within bushings 126 and 127 within the transmission support bracket 128.

Gear 129 is keyed to shaft 125 and, as shown in Fig. 7, is in mesh with gear 96 on shutter drive shaft 94. Accordingly, on rotation of motor drive shaft 106, the shutter 89 is immediately rotated.

Disc segment 130 is secured by pin 131 to shaft 125, said disc segment terminating in the portion 132 of reduced diameter, as shown in Fig. 7. Said disc segment throughout the first 180 degrees of its rotation is in sliding retaining registry with the arcuate groove 133 in the detainer disc 134 which is secured by pin 136 to shaft 135. Said shaft is journaled within the supporting bushings or sleeves 137 and 138 carried by the mounting bracket 128, as best illustrated in Fig. 6. Accordingly, for the first 180 degrees of rotation of shaft 125 and a corresponding amount of rotation of shutter 89, shaft 135 is retained against rotation. Thereafter, disc segment 130 is disengaged from detainer disc 134 so that shaft 135 is free to rotate.

Gear segment 139 is mounted upon the hub 140 of disc segment 130 and is secured thereto for rotation in unison by the interconnecting transverse pin 141, Fig. 6. Gear 139 is in mesh with segmented gear 142 which is mounted upon the hub 144 secured to shaft 135 as by pin 136. Gear 142 is secured by pin 143 to the said hub 144.

Referring to Fig. 7, gear 139 is a 180 degree gear segment and accordingly for the first 180 degrees of rotation thereof during film exposure will not be in driving relation with gear 142. This corresponds also to the first 180 degree rotation of the disc segment 130 with respect to the detainer disc 134. Accordingly, when the said detainer disc is released for rotation, at the same time gear segment 139 will be in mesh with gear 142 for driving the same, and shaft 135.

Spur gear 145 is secured to rotatable hub 144 and is in mesh with gear 146 secured upon the locator 147 which is loosely journaled upon shaft 125. Drive gear 148 is also secured to locator 147 and is in mesh with gear 102, which is secured to locator 101, which is mounted and secured to sprocket drive shaft 97 as by the pin 149. Shaft 97 and its drive gear 102 for operating the film sprocket drive is also shown in Fig. 5. The gear relation is also shown in Fig. 7. In this connection, it will be noted that shaft 97 is journaled through the bushings 98 and 99 which are mounted upon the bracket 128 to thereby complete the power transmission from the motor to the shutter control shaft 94, as well as to the sprocket drive shaft 97.

*Operation*

Aperture 92 in shutter disc 89 is shown in Fig. 3 in its normal stopped position. On energization of motor 105, its driveshaft 106 rotates gear 123, driving gear 124 secured on shaft 125, Figs. 6 and 7. Gear 129 on shaft 125 drives gear 96 on shutter driveshaft 94 shown in Figs. 5 and 7 which continuously rotate shutter disc 89 360 degrees and automatically stops with its aperture 92 again in the normal "stop" position shown in Fig. 3. At the end of the first 90 degrees of rotation, aperture 92 passes in momentary registry with lens 86 and aperture 48, Figs. 3 and 5 exposing a single frame of stationary film 34. During the first 180 degrees of rotation of the shutter and its aperture 92, the film is stationary because no driving power is applied to film sprocket driveshaft 97, Fig. 5.

During the first 180 degrees of rotation of shutter disc 89, shaft 125 rotates disc segment 130 in interlocked relation with detainer disc 134, preventing rotation of shaft 135. During this same period, shaft 125 rotates the toothless portion of gear segment 139 through an arc of 180 degrees before it meshes with gear 142 in driving relation initiating rotation of shaft 135 and gear 145 thereon. Gear 145 drives idle gear 146 loosely journaled on shaft 125, which gear is connected to a similarly journaled gear 148 in mesh with gear 102 on sprocket driveshaft 97, Figs. 5-7.

Accordingly during the first 180 degrees of rotation of shutter 89, the film is exposed momentarily. After the first 180 degrees of rotation of said shutter, rotative power is transmitted to the film drive sprocket 63 for feeding the film 34 simultaneously with and until shutter 89 has completed its 360 degrees of rotation and automatically stops at the position shown, in Fig. 3. This rotation of sprocket 63 is just sufficient to feed the film a distance equal to a single frame. Thus a new unexposed frame is in registry with aperture 48 ready for the next cycle. The aperture 48 is closed off from light by the opaque portion of shutter disc 89.

After gear segment 139 completes its drive of gear 142, causing gear 145 to indirectly rotate the sprocket driveshaft feeding the film, being a rotation of segment 139 through an arc of 180 degrees, disc segment 130 retainingly engages detainer disc 134 to prevent any further rotation thereof by momentum or otherwise, during subsequent film exposure and until gear 139 is again in position to drive the film drive sprocket for a successive feed of one new film frame.

Referring to Fig. 6, cam sleeve 151 is secured at 152 to drive shaft 125 which is interconnected with the shutter drive shaft, as above described, and has a cam surface 153 adapted upon the completion of 360 degrees of rotation to operatively engage push button 154 of limit switch 155. This limit switch is interconnected in the electrical circuit which includes the camera drive motor and a source of electricity whereby said motor will be immediately de-energized upon completion of the 360 degrees of rotation of the said shutter.

A second cam 156 is secured also to driven shaft 125 and is adapted to operatively engage the second limit switch 157. This limit switch is also connected in an electrical circuit which includes an external indicator 108, Fig. 10 which may be a lamp or a counter, and a source of power whereby, upon energization, indicates a single exposure.

Solenoid 120 is in series with the source of power to motor 105 so that when the motor is energized the brake is simultaneously released. On de-energizing the motor, solenoid 120 is de-activated and the motor brake is automatically applied.

Referring to Fig. 4, there is also shown an additional cam 158 secured to the shutter shaft 94 which is adapted to operatively engage the control element of another limit switch 159. This limit switch is connected in a conventional electrical circuit which includes the power source and the strobe 160 whereby, when the shutter aperture 92 registers with the lens aperture, there will be a momentary energization of the strobe mechanism 160 for activating an external light source such as shown at 179 in Fig. 9, for example. Cam 158 on shaft 94 is 90 degrees in advance of aperture 92 so that rotation of the shutter disc 90 degrees from the position of Fig. 3 to exposure position causes cam 158 to take the position shown in Fig. 4.

In Fig. 4 there is also shown the mounting bracket 161 upon which is mounted relay switch 162 diagrammatically shown adapted for connection in the electrical circuit. There is also provided an additional relay switch 163 which is in the nature of a delay safety relay.

The control cam 153, Fig. 6, may be of such construction as to limit rotation of shutter 89 to multiples of 360 degrees and corresponding exposures for each complete revolution. As cam 153 and its supporting first driven shaft 125 must make one revolution corresponding to one revolution of shutter shaft 94, also referred to as a first rotatable shaft, both shafts 125 and 94 should rotate at the same speed. Accordingly, as shown in Fig. 7, gears 129 and 96 are the same size.

With reference to lamp 179 of Fig. 9, any type of illumination may be employed, as a flash lamp, arc light, or bulbs. The flash control 160 is shown diagrammatically in Fig. 4 and is adapted to momentarily energize lamp 179 for each exposure.

Figure 10:
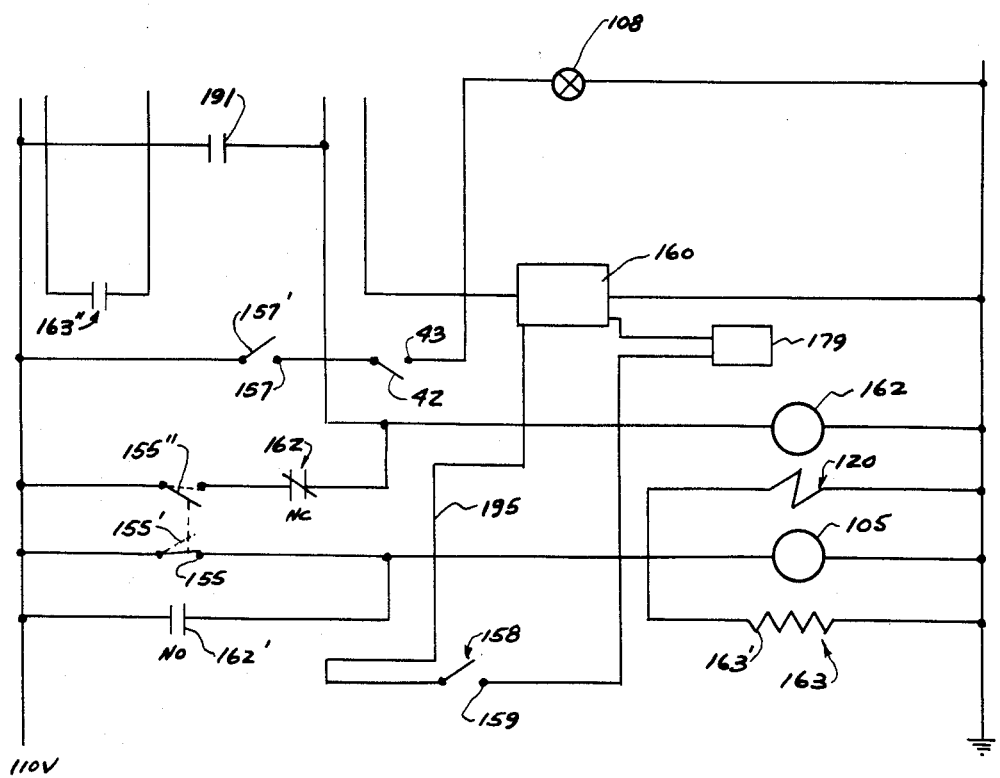
Fig. 10 is a wiring diagram.

Referring to the wiring diagram of Fig. 10, the flash control 160 is diagrammatically indicated and connected in a circuit with a power source and through the lead wire 195 to the source of illumination 179 diagrammatically shown. Interposed in this circuit is the switch 159, also shown in Fig. 4, and which is under the control of the switch element or cam 158. Accordingly, upon a predetermined extent of rotation, the normaly open switch 159 is closed by the switch element or cam 158 at a moment which corresponds to the positioning of aperture 92 of the shutter in registry with aperture 48 of Fig. 5, and the film for momentarily illuminating the flash or strobe light 179.

As diagrammatically indicated in Fig. 10, in parallel circuit with motor 105, there is the delay relay 163, also shown in Fig. 4, which includes the heating element 163' and the contacts 163" which will open upon heating to break the electrical circuit to the motor and to all other connections.

The limit switch 155 shown in Fig. 6, and as shown in Fig. 10 includes the normally open point 155' and the normally closed point 155". Cam 153 normally maintains point 151 closed permitting energization of motor 105. At the end of 360 degrees of rotation, cam 153 releases point 155', breaking the circuit to the motor, shutting it down, and at the same time point 155", which was open, is now closed to energize the holding relay switch 162, also found in Fig. 10.

This switch is so connected with motor 105 as to permit its re-energization upon the next closing of an external switch such as switch 191, which may be positioned within the coin box 169, shown in Fig. 9 or elsewhere.

Switch 157 with points 157' is normally open and upon a predetermined rotation of cam 156, such as 360 degrees, the indicator 108, which may be a lamp or a counter, will be momentarily activated, i.e., once each revolution of the shutter.

On closing the starting switch 191 the coil in relay 162 is energized. This momentarily closes the normally open points 162', shown in Fig. 10, completing a circuit to the motor 105. Subsequent rotation of cam 153 closes point 155', opening point 155", deactivating relay 162.

Coin control camera combination for hospital nursery

Referring to Fig. 9, numeral 164 designates the interior of an infant nursery in a hospital and 165 the exterior hallway separated from the nursery by the upright partition wall 166 and the glass panel 167, a suitable bassinette 168 being positionable within the nursery adjacent the window 167 for the purpose of properly positioning a newborn infant whose picture is to be taken by the present coin controlled mechanism which includes the camera heretofore described.

A conventionally operable coin control box 169 is mounted upon the exterior of partition 166 and is adapted to receive a predetermined coin and which, upon activation, will initiate or energize the electrical circuit to the power motor 105 within the camera housing 11 which is arranged upon the outside of the glass partition 167 and is supported at its upper end by the mounting plates 170 secured to the camera housing by the bolts 171.

The mounting plates 170 are pivotally mounted as at 172 to the upright depending bracket 173 which is anchored at 174 to the upper wall partition 166. Mounting plate 170 includes a pair of upright parallel spaced mounting elements 178, both of which have upright slots 177 formed therein adapted to receive the fastening bolts 175. These bolts extend through the said slots and also through the corresponding outwardly directed slots 176 formed in the upright parallel spaced extensions 178' which form a part of bracket 173. By this construction camera housing 11 may be angularly adjusted with respect to bracket 173 and secured in the desired angular position.

Rectangularly shaped mirror 181 has a mounting plate secured to its rear surface as by the bolts 183. From this mounting plate there are provided a pair of parallel spaced upright support elements 182 having transverse slots 186 formed therethrough. The said mounting elements 182 are pivotally connected at 184 to the depending bracket 185 whose upper transversely arranged mounting plate 189 is secured by bolts 188 to the upper wall partition 166 with a suitable spacer 19 interposed.

The fastening bolts 187 project through the lower portions of the bracket 185, of which there are two, in parallel spaced relation, one being shown in Fig. 9; and these bracket elements cooperatively engage the upright parallel spaced mounting elements 182 on the back of mirror 181, and are adjustably secured thereto in the manner indicated by the bolts 187. Accordingly, the mirror 181 may be pivotally adjusted at point 184 and secured at 187 in the desired angular position, such that the image lines 191 from the bassinette will be properly reflected by the mirror along the lines 192 for proper registry with the camera lens.

By this construction, a very convenient method is provided for photographing a new-born baby by merely properly positioning the bassinette at a predetermined location and with the parents or other person merely inserting a coin in the coin control box 169 at the correct moment to thereby automatically obtain a photograph of the child through the automatic operation of the camera 11 hereinabove described. Accordingly, suitable identification means will be provided so that there will be a relation established between picture taker and the particular film exposed, such as by a suitable numbering system so that the completed and developed picture may be delivered to the buyer.

Having described my invention, reference should now be had to the claims which follow for determining the scope thereof.

I claim:

1. In a camera, a hollow housing, a rotatable first shaft journaled therein, an apertured shutter disc mounted on and secured to said shaft, a rotatable second shaft journaled on said housing, a film drive sprocket secured thereon, an electric motor on said housing having a driveshaft, and a gear transmission in said housing interconnecting said driveshaft and said first and second shafts respectively, said transmission including a first driven shaft journaled on the housing geared to said motor driveshaft and to the shutter driveshaft, a second driven shaft journaled on the housing, gear means interconnecting said second driven shaft with said sprocket driveshaft, a detainer on said first shaft retainingly engaging said second driven shaft intermittently, and a gear segment secured on said first driven shaft adapted for gear driving relation with said second driven shaft after said first driven shaft has rotated 180 degrees, said detainer consisting of a 180 degree disc segment slidably and retainingly engaging a grooved detainer disc on said second driven shaft, said gear segment extending through 180 degrees.

2. The camera of claim 1, and means controlled by the first driven shaft for deenergizing said motor, after said shutter has rotated 360 degrees, said means consisting of an electric circuit, including a power source joined to said motor, a normally closed limit shutoff switch in said circuit, and a cam secured on said first driven shaft operatively engageable with said switch at the completion of 360 degrees of rotation thereof to deenergize said motor.

References Cited in the file of this patent

UNITED STATES PATENTS

| | | |
|---|---|---|
| 943,232 | Ashe | Dec. 14, 1909 |
| 1,064,252 | Proctor | June 10, 1913 |
| 1,346,358 | Wenderhold | July 13, 1920 |
| 1,559,815 | Victor | Nov. 3, 1925 |
| 1,897,903 | Hopkins | Feb. 14, 1933 |
| 1,915,791 | Klimis et al. | June 27, 1933 |
| 1,962,031 | Porter | June 5, 1934 |
| 2,192,755 | Rabkin et al. | Mar. 5, 1940 |
| 2,218,245 | Lindenberg | Oct. 15, 1940 |
| 2,257,424 | Meyer | Sept. 30, 1941 |
| 2,351,399 | Caracciolo et al. | June 13, 1944 |
| 2,422,354 | Holbrook | June 17, 1947 |
| 2,446,638 | Crumrine | Aug. 10, 1948 |
| 2,520,296 | Williams | Aug. 29, 1950 |
| 2,521,734 | Lilienfeld | Sept. 12, 1950 |
| 2,534,214 | Allen | Dec. 19, 1950 |
| 2,552,018 | Schwartz et al. | May 8, 1951 |
| 2,552,250 | Bornemann et al. | May 8, 1951 |
| 2,679,790 | Clark | June 1, 1954 |
| 2,754,721 | Grass | July 17, 1956 |
| 2,772,941 | Hulcher | Dec. 4, 1956 |
| 2,809,571 | Christensen | Oct. 15, 1957 |

OTHER REFERENCES

"The Washington Star Pictorial Magazine," published Feb. 19, 1950.